(12) United States Patent
Emery et al.

(10) Patent No.: US 7,279,083 B2
(45) Date of Patent: Oct. 9, 2007

(54) ELECTRODEIONISATION APPARATUS

(75) Inventors: Nigel Philip Emery, High Wycombe (GB); Paul Whitehead, Henley on Thames (GB); Roger John Woodward, High Wycombe (GB)

(73) Assignee: VWS (UK) Ltd, Buckinghamshire (GB)

( * ) Notice: Subject to any disclaimer, the term of this patent is extended or adjusted under 35 U.S.C. 154(b) by 620 days.

(21) Appl. No.: 10/332,658

(22) PCT Filed: Jul. 5, 2001

(86) PCT No.: PCT/GB01/02967

§ 371 (c)(1),
(2), (4) Date: Jul. 2, 2003

(87) PCT Pub. No.: WO02/04357

PCT Pub. Date: Jan. 17, 2002

(65) Prior Publication Data

US 2004/0035802 A1    Feb. 26, 2004

(30) Foreign Application Priority Data

Jul. 10, 2000  (GB)  ................................. 0016846.8

(51) Int. Cl.
*B01D 61/48*  (2006.01)
(52) U.S. Cl. ...................... 204/533; 204/536; 204/632; 204/634
(58) Field of Classification Search ................ 204/524, 204/533, 536, 632, 634

See application file for complete search history.

(56) References Cited

U.S. PATENT DOCUMENTS

| | | | |
|---|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |

(Continued)

FOREIGN PATENT DOCUMENTS

AU     B-18629-92     10/1992

(Continued)

OTHER PUBLICATIONS

ASTM, "Standard Practice for Calculation and Adjustment of the Langelier Saturation Index for Reverse Osmosis," Designation: D3739-94 (Reapproved 1998), pp. 1-4, no month.

(Continued)

*Primary Examiner*—Arun S. Phasge
(74) *Attorney, Agent, or Firm*—Drinker Biddle & Reath LLP

(57) ABSTRACT

An electrodeionisation apparatus comprising, successively: means defining an anode chamber, means defining one or more anion exchange chambers, means defining one or more mixed exchange chambers, means defining one or more cation exchange chambers, and means defining a cathode chamber, the anion, mixed and cation exchange chambers providing a flow path for water to be purified, is described. The present invention incorporates advantages of both separate resin bed and mixed resin bed technology.

23 Claims, 1 Drawing Sheet

U.S. PATENT DOCUMENTS

Figure 1:
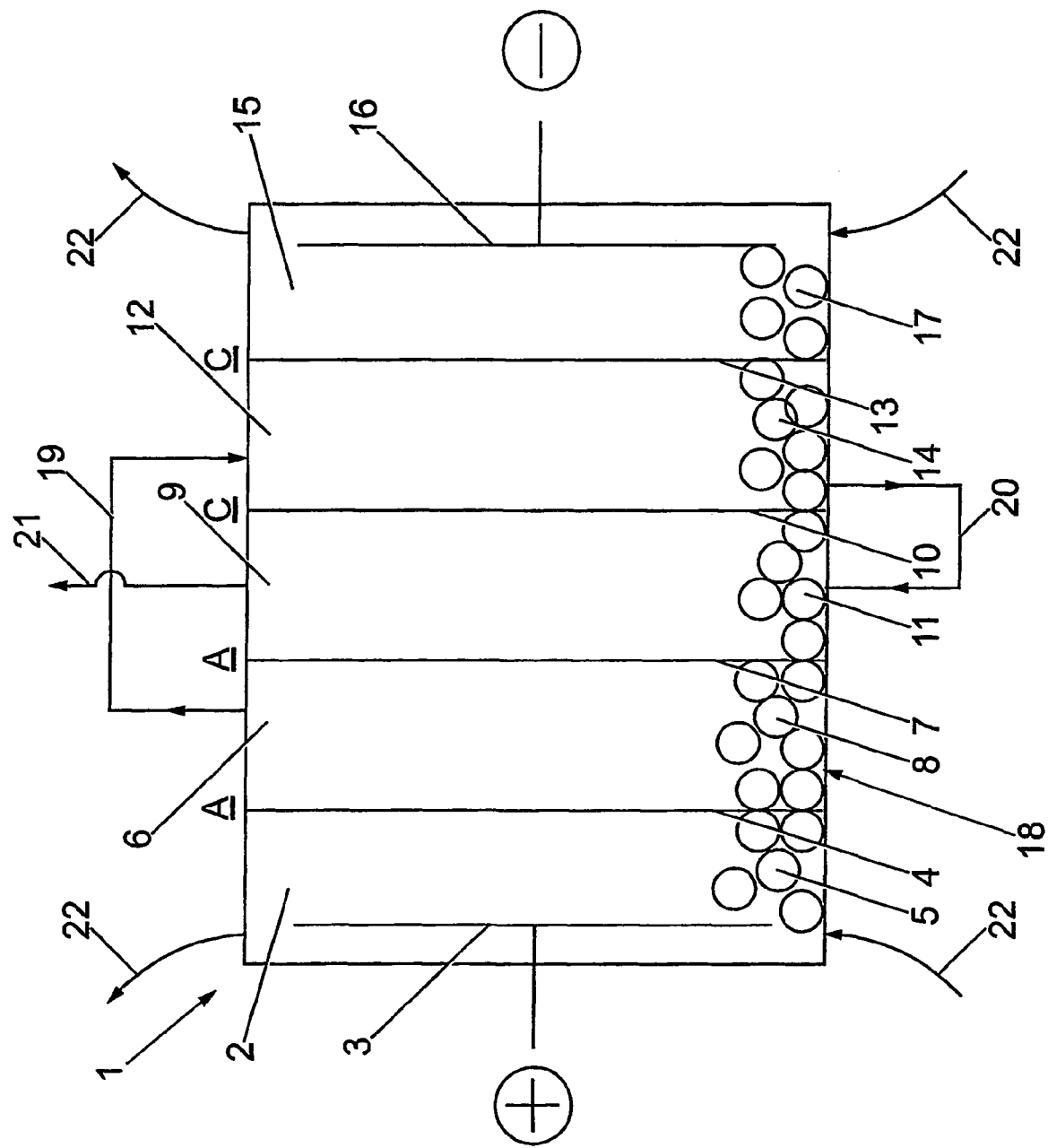

| | | |
|---|---|---|
| 3,014,855 A | 12/1961 | Kressman |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,645,884 A | 2/1972 | Gilliland |
| 3,686,089 A | 8/1972 | Korngold |
| 3,755,135 A | 8/1973 | Johnson |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hedge et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,753,681 A | 6/1988 | Giuffrida et al. |
| 4,770,793 A | 9/1988 | Treffry-Goatley et al. |
| 4,804,451 A | 2/1989 | Palmer |
| 4,849,102 A | 7/1989 | Latour et al. |
| 4,871,431 A | 10/1989 | Parsi |
| 4,872,958 A | 10/1989 | Suzuki et al. |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| 5,240,579 A | 8/1993 | Kedem |
| 5,254,227 A | 10/1993 | Cawlfield et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,954,935 A | 9/1999 | Neumeister et al. |
| 5,961,805 A | 10/1999 | Terada et al. |
| 5,980,716 A | 11/1999 | Horinouchi et al. |
| 6,056,878 A | 5/2000 | Tessier et al. |
| 6,099,716 A | 8/2000 | Molter et al. |
| 6,149,788 A | 11/2000 | Tessier et al. |
| 6,187,162 B1 | 2/2001 | Mir |

| | | | |
|---|---|---|---|
| 6,190,528 | B1 | 2/2001 | Li et al. |
| 6,190,558 | B1 | 2/2001 | Robbins |
| 6,193,869 | B1 | 2/2001 | Towe et al. |
| 6,197,174 | B1 | 3/2001 | Barber et al. |
| 6,214,204 | B1 | 4/2001 | Gadkaree et al. |
| 6,228,240 | B1 | 5/2001 | Terada et al. |
| 6,235,166 | B1 | 5/2001 | Towe et al. |
| 6,248,226 | B1 | 6/2001 | Shinmei et al. |
| 6,254,741 | B1 | 7/2001 | Stuart et al. |
| 6,258,278 | B1 | 7/2001 | Tonelli et al. |
| 6,267,891 | B1 | 7/2001 | Tonelli et al. |
| 6,284,124 | B1 | 9/2001 | DiMascio et al. |
| 6,284,399 | B1 | 9/2001 | Oko et al. |
| 6,303,037 | B1 | 10/2001 | Tamura et al. |
| 6,365,023 | B1 * | 4/2002 | De Los Reyes et al. .... 204/524 |
| 6,402,916 | B1 | 6/2002 | Sampson et al. |
| 6,402,917 | B1 | 6/2002 | Emery et al. |
| 6,482,304 | B1 | 11/2002 | Emery et al. |
| 2001/0003329 | A1 | 6/2001 | Sugaya et al. |
| 2002/0189951 | A1 | 12/2002 | Liang et al. |
| 2003/0079992 | A1 | 5/2003 | Wilkins et al. |

FOREIGN PATENT DOCUMENTS

| | | |
|---|---|---|
| CN | 1044411 A | 8/1990 |
| DE | 1 201 055 | 9/1965 |
| DE | 32 38 280 A1 | 4/1984 |
| DE | 44 18 812 A1 | 12/1995 |
| DE | 199 42 347 A1 | 3/2001 |
| EP | 0 503 589 B1 | 9/1992 |
| EP | 0 621 072 A2 | 10/1994 |
| EP | 0 680 932 A2 | 11/1995 |
| EP | 0 870 533 A1 | 10/1998 |
| EP | 1 068 901 A2 | 1/2001 |
| EP | 1 075 868 A2 | 2/2001 |
| EP | 1 101 790 A1 | 5/2001 |
| EP | 1 106 241 A1 | 6/2001 |
| GB | 776469 | 6/1957 |
| GB | 877239 | 9/1961 |
| GB | 880344 | 10/1961 |
| GB | 942762 | 11/1963 |
| GB | 1048026 | 11/1966 |
| GB | 1137679 | 12/1968 |
| GB | 1448533 | 9/1976 |
| GB | 2 311 999 | 10/1997 |
| JP | 47 49424 | 12/1972 |
| JP | 52-71015 | 6/1977 |
| JP | 54-5888 | 1/1979 |
| JP | 7-265865 | 10/1995 |
| JP | 2001-79358 | 3/2001 |
| JP | 2001-79553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| WO | WO 92/11089 A1 | 7/1992 |
| WO | WO 95/32052 A1 | 11/1995 |
| WO | WO 95/32791 A1 | 12/1995 |
| WO | WO 96/22162 A1 | 7/1996 |
| WO | WO 97/25147 A1 | 7/1997 |
| WO | WO 97/46491 A1 | 12/1997 |
| WO | WO 97/46492 A1 | 12/1997 |
| WO | WO 98/11987 A1 | 3/1998 |
| WO | WO 98/20972 A1 | 5/1998 |
| WO | WO 99/39810 A1 | 8/1999 |
| WO | WO 00/30749 A1 | 6/2000 |
| WO | WO 00/64325 A2 | 11/2000 |
| WO | WO 00/75082 A1 | 12/2000 |
| WO | WO 01/49397 A1 | 7/2001 |
| WO | WO 02/14224 A1 | 2/2002 |

OTHER PUBLICATIONS

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470, no month.

Dimascio et al., "Continuous Electrodeionization: Production of High-Purity Water without Regeneration Chemicals," The Electrochemical Society *Interface*, Fall 1998, pp. 26-29, no month.

Dimascio et al., "Electrodiaresis Polishing (An Electrochemical Deionization Process)," *Proc. Electrochem. Soc.* (1994) vol. 94-19, pp. 164-72, no month.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

DUPONT Product Information, "NAFION Perfluorinated Membranes," printed Nov. 1993, 4 pages.

DUPONT Product Information, "Nafion perfluorinated polymer products," Sep. 1998, 4 pages.

DUPONT Product Information, "Nafion perfluorinated membranes," Bulletin 97-01, Jan. 14, 1999, 8 pages.

Farmer et al., Capacitive Deionization of $NH_4CIO_4$ Solutions with Carbon Aerogel Electrodes, *J. Appl. Electro-Chemistry*, vol. 26, (1996), pp. 1007-1018, no month.

FDA, "Guide to Inspections of High Purity Water Systems," Guide dated Jul. 1993. 10 pages. printed from www.fda.gov. on Apr. 18, 2003.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E. Symposium Series No. 9, 1965 (London: Instn chem. Engrs), pp. 79-83, no month.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," *Proceedings of the Electrochemical Society*. vol. 94-19, pp. 173-183 (1994), no month.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-298, no month.

Kedem et al., "Reduction of Polarization by Ion-Conduction Spacers: Theoretical Evaluation of a Model System," *Desalination*, vol. 27, 1978, pp. 143-156, no month.

Korngold, "Electrodialysis Process Using Ion Exchange Resins Between Membranes," *Desalination*, vol. 16, 1975, pp. 225-233, no month.

Matejka, "Continuous Production of High-Purity Water by Electro-Deionisation," *J. Appl. Chem., Biotechnol.*, vol. 21, Apr. 1971, pp. 117-120.

Purolite Technical Bulletin, Hypersol-Macronet™ Sorbent Resins, 1995, no month.

V. Shaposhnik et al., "Demineralization of Water by Electrodialysis with Ion-Exchange Membranes, Grains and Nets," *Desalination*, vol. 133, (2001), pp. 211-214, no month.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158, no month.

R. Simons, "Water Splitting In Ion Exchange Membranes," *Electrochimica Acta* 30(3):275-282. 1985, no month.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs, no month.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

Wood, Jonathan et al., "Hot Water Sanitization of Continuous Electrodeionization Systems," *Pharmaceutical Engineering*, vol. 20, No. 6, Nov./Dec. 2000, pp. 1-15.

* cited by examiner

ELECTRODEIONISATION APPARATUS

The present invention relates to an electrodeionisation apparatus for purifying water and method therefor.

Apparatus and methods for electrodeionisation to provide purified water are well known, see for example our GB-A-2311999 and U.S. Pat. No. 4,687,561. Generally, water to be purified is passed along a deionising path set between an anode and a cathode. The application of a potential difference between the anode and cathode causes anions and cations in the impure water to migrate towards their respective attracting electrodes through perm-selective membranes.

In general, such apparatus has the chambers for exchanging anions and cations juxtapositioned so that the anions and cations removed from the water being purified both travel towards one or more 'concentrating' chambers, through which a desalting stream flows to remove the unwanted anions and cations.

It is an object of the present invention to provide a simplified electrodeionisation apparatus and method.

According to one aspect of the present invention, there is provided an electrodeionisation apparatus comprising, successively:
  means defining an anode chamber,
  means defining one or more anion exchange chambers,
  means defining one or more mixed exchange chambers,
  means defining one or more cation exchange chambers, and
  means defining a cathode chamber,
the anion, mixed and cation exchange chambers providing a flow path for water to be purified.

By locating the or each anion exchange chamber next to the anode chamber, and locating the or each cation exchange chamber next to the cathode chamber, the apparatus of the present invention provides an opposite or reverse flow-path for exchanged anions and cations than prior apparatus. The exchanged anions and cations in the water being purified are directly attracted to neighbouring electrodes, rather than being attracted to distal electrodes located across opposing exchange chambers of prior electrodeionisation apparatus.

In one embodiment of the present invention, the apparatus involves one anion exchange chamber and one cation exchange chamber.

Located between the chambers are perm-selective membranes as are known in the art. Those membranes located between the or each central mixed exchange chamber and the cathode chamber should be cation membranes, and those membranes located between the or each mixed exchange chamber and the anode chamber should be anion membranes.

Preferably, the or each anion exchange chamber partly, substantially or wholly contains anion exchange material, and the or each cation exchange chamber partly, substantially or wholly contains cation exchange material.

Preferably, the anode chamber partly, substantially or wholly contains ion exchange material, preferably cation exchange material. Preferably, the cathode chamber, partly, substantially or wholly contains ion exchange material, more preferably cation exchange material. Also preferably, the or each mixed exchange chamber partly, substantially or wholly contains mixed ion exchange material. Ion exchange materials are known in the art, one example being resin beads.

The anode and cathode chambers are preferably flushed with a desalting stream such as water to elute ions from the system as concentrate.

In another embodiment of the present invention, water to be purified is firstly passed through an anion exchange chamber of the apparatus, then through a cation exchange chamber, and subsequently through a mixed exchange chamber.

Alternatively, water to be purified is passed through a cation exchange chamber, then through an anion exchange chamber, and subsequently through a mixed exchange chamber.

Where apparatus of the present invention involves two or more anion exchange chambers and/or two or more cation exchange chambers and/or two or more mixed exchange chambers, then impure water flow path could be directed through subsequent anion exchange chambers and/or subsequent cation exchange chambers and/or subsequent mixed exchange chambers in the same or any suitable or relevant order.

In a third embodiment of the present invention, water to be purified by the present apparatus is combined with already purified water, so reducing, by dilution, the load on the exchange materials. The already purified water may be provided from a separate source, or be provided by recirculating outflow from the present apparatus, which outflow could be temporarily held in a reservoir such as a holding tank.

According to a fourth embodiment of the present invention, the anion, cation and mixed exchange chambers are relatively thick compared with chambers of prior art electrodeionisation apparatus. The simplicity of the present invention allows thicker chambers and beds of ion exchange materials to be used, compared with the conventional view that thinner beds are necessary to maintain electric current flow thereacross.

The present invention also extends to a 'multiple' unit still only involving one set of electrodes. For example, the unit could be arranged: anode (chamber), anion, mixed, cation, concentrate . . . , anion, mixed, cation, concentrate . . . , anion, mixed, cation, cathode.

According to a second aspect of the present invention, there is provided a method of electrodeionisation comprising causing or allowing water to be purified to flow through an anion exchange chamber neighbouring an anode chamber, followed by flow through a cation exchange chamber neighbouring a cathode chamber, or vice versa, followed by flow through a mixed exchange chamber located between the anion exchange chamber and the cation exchange chamber.

The method of the present invention could use electrodeionisation apparatus as described above. In the method of the present invention, the water to be purified could be pre-mixed with a proportion of already purified water.

In general, water may be passed through each chamber independently, allowing different flow rates, including no flow, at different times.

An embodiment of the present invention will now be described by way of example only, and with reference to the accompanying drawing, FIG. 1, which is a schematic cross-sectional side view of apparatus according to the present invention.

Referring to the drawing, FIG. 1 shows an electrodeionisation apparatus in the form of a stack (1). The stack (1) has five chambers. The first chamber (2) is an anode chamber bounded on one side by an anode (3) and on the other by an anion membrane (4). The anode chamber (2) contains cation exchange resin beads (5). Juxtaposed the anode chamber (2) is an anion exchange chamber (6) bounded on one side by the anion membrane (4), and on the other side by a second anion membrane (7). The anion exchange chamber (6)

contains anion exchange resin beads (8). Next to the anion exchange chamber (6) is a mixed exchange chamber (9), bounded by the second anion membrane (7) and a cation membrane (10). This chamber (9) contains mixed ion exchange resin beads (11).

Juxtaposed the mixed exchange chamber (9), there is a cation exchange chamber (12) bounded by the cation membrane (10), and a second cation membrane (13). The cation exchange chamber (12) contains cation exchange resin beads (14).

Juxtaposed the cation exchange chamber (12) lies a cathode chamber (15) bounded by the second cation exchange membrane (13) and a cathode (16). The cathode chamber (15) contains cation exchange resin (17).

The nature and form of the electrodes, membranes and ion exchange materials are all known in the art.

In use, impure feed water (18) enters the stack (1), and firstly enters the anion exchange chamber (6). The anion exchange resin beads (8) in this chamber (6) replace the anions in the feed water with hydroxide ions from the resin beads (8). The anions then move towards and through the anion exchange membrane (4) to the anode chamber (2). The driving force for this movement is an electrical potential placed between the anode (3) and cathode (16). The feed water (19) exiting this chamber (6) is then passed into the cation exchange chamber (12), where the cation exchange resin beads (14) exchange cations in the feed water for hydrogen ion. The cations then move towards and through the cation exchange membrane (13) to the cathode chamber (15).

The water (20) exiting this chamber (12) is then passed into the mixed resin chamber (9). The mixed resin beads remove both anionic and cationic ions that have passed through the first two chambers (6, 12). Ions removed in the mixed exchange chamber (9) pass through the relevant ion exchange membranes (7, 10) to the single exchange chambers, where they, as well as ions exchanged therein, pass through the relevant ion exchange membranes into the electrode compartments.

From the mixed chamber (9) final product water (21) is obtained for use.

The electrode compartments (2, 15) are flushed with water to elute the ions from the system as concentrate (22). This flow may be in series or in parallel.

In an alternative arrangement, feed water could firstly be passed into the cation exchange chamber (12), followed by the anion exchange chamber (6), before being passed into the mixed exchange chamber (9). This alternative flow-path arrangement also allows the removal of precipitative cations such as calcium before they reach the anion exchange material (8) and anion membranes (4, 7) on which they are likely to precipitate. As these ions pass into the cathode exchange chamber (12), it is preferable to maintain a low pH in the cathode exchange chamber (12) and to feed the cathode chamber (15) with water, or acid, devoid of precipitative ions.

The product water (21) exiting the mixed exchange chamber (9) of the present invention has been found to be of low ionic content. Indeed, the flow rate and purification achieved by the present invention is comparable with prior art EDI apparatus, which generally involves a significantly more complex arrangement of chambers.

In another arrangement of the present invention, the feed water (18) is pre-mixed with a proportion of already purified water (21). By diluting the load (i.e. concentration of impure ions to be removed from the water), a higher flow rate through the apparatus can be achieved.

Indeed, a ratio of 10:1 of already purified water:impure water allows a flow rate of at least ⅔ litres per minute through the apparatus shown in FIG. 1. The already purified water could be supplied from a separate source, or be re-circulated product water (21) from the present apparatus.

The following test data using a design of stack as shown in FIG. 1 confirms the benefit of the present invention:

EXAMPLE 1

A stack with internal plate dimensions 150 mm×66 mm×15 mm was operated on a blend of reverse osmosis permeate and deionised water. With a feed of conductivity 18.2 µS/cm (adjusted to 25° C.) the stack purified 0.55 litres per minute to a conductivity of 0.073 µS/cm when a current of 1.3 amps was applied between the electrodes. With a feed of 7.2 µS/cm, 1.37 litres per minute were purified to 0.092 µS/cm at 1.3 amps.

EXAMPLE 2

A stack with dimensions 135 mm×68 mm×10 mm was operated recirculating from a tank. Water was intermittently taken off after the stack and extra make up was fed to the stack from a reverse osmosis membrane. The applied current was 3.16 amps. When the reverse osmosis unit was operating the feed to the stack was 12.5 µS/cm and this was purified at a rate of 1.95 litres per minute to 0.062 µS/cm. When recirculating from the tank the feedwater reduced in conductivity to 0.32 µS/cm at which time the product water was 0.057 µS/cm.

The present invention incorporates advantages of both separate resin bed and mixed resin bed technology. Separate resin beds are beneficial for removing known amounts of defined ionic impurity types, both anion and cation, and the current passing through that resin bed can be utilised in removing solely that type of ion.

If the feed water is first passed through a cation exchange resin bed, cations can be removed from the solution causing a reduction in the solution pH. Similarly, an anion resin bed will increase the pH. Changes in pH help to prevent bacterial growth, and may also be used to prevent precipitation, or increase the ionic nature of weakly charged species.

Meanwhile, mixed resin beds have been noted to handle high flow rates of water whilst still achieving high levels of purification.

The present invention has several further advantages. It provides a compact purification unit using a single set of electrodes. It is of simple form, allowing simplified manufacturing thereof, with less complication and therefore with reduced risk of potential breakdown.

As mentioned before, water may be passed through each chamber independently, allowing different flow rates, including no flow, at different times.

Also, the number of chambers of the present invention, possibly being only five, are less than many prior art apparatus, thus reducing the problems of back pressure on the feed water, and allowing a faster flow rate therethrough. The use of relatively thick chambers in the present invention also reduces the feed water back pressure.

Furthermore, feed water through the present invention does not pass through the anode or cathode chambers as occurs in some prior art apparatus, thereby avoiding the problem of gas in the product water.

Also, the present invention aids removal of weakly ionised species, and can be used in a manner to inhibit precipitative fouling.

What is claimed is:

1. An electrodeionisation apparatus comprising successively:
   pan anode chamber,
   one or more anion exchange chambers,
   one or more mixed exchange chambers,
   one or more cation exchange chambers, and
   a cathode chamber,
   the anion, mixed and cation exchange chambers providing a flow path for water to be purified,
   wherein the or each anion exchange chamber contains exchange material consisting essentially of anion exchange material; and
   wherein the or each cation exchange chamber contains exchange material consisting essentially of cation exchange material;
   wherein any membrane located between the or each mixed exchange chamber and the anode chamber is an anion membrane and any membrane located between the or each central mixed exchange chamber and the cathode chamber is a cation membrane.

2. The apparatus as claimed in claim 1 involving one anion exchange chamber and one cation exchange chamber.

3. The apparatus as claimed in claim 1 wherein the anode chamber partly, substantially or wholly contains ion exchange material.

4. The apparatus as claimed in claim 3 wherein the ion exchange material is resin beads.

5. The apparatus as claimed in claim 3 wherein the cathode chamber partly, substantially or wholly contains ion exchange material.

6. The apparatus as claimed in claim 3 wherein the ion exchange material is cation exchange material.

7. The apparatus as claimed in claim 1 wherein the cathode chamber partly, substantially or wholly contains ion exchange material.

8. The apparatus as claimed in claim 7 wherein the ion exchange material is cation exchange material.

9. The apparatus as claimed in claim 7 wherein the ion exchange material is resin beads.

10. The apparatus as claimed in claim 1 wherein the or each mixed exchange chamber partly, substantially or wholly contains mixed ion exchange material.

11. The apparatus as claimed in claim 1 wherein the or each anion, cation and/or mixed exchange chambers are between 10-20 mm wide.

12. A method of electrodeionisation comprising allowing water to be purified to flow through an anion exchange chamber containing exchange material consisting essentially of anion exchange material and neighboring an anode chamber, followed by flow through a cation exchange chamber containing exchange material consisting essentially of cation exchange material and neighboring a cathode chamber, followed by flow through a mixed exchange chamber located between the anion exchange chamber and the cation exchange chamber;
    allowing anions to flow from the mixed exchange chamber to the anion exchange chamber and from the anion exchange chamber to the anode chamber through anion membranes; and
    allowing cations to flow from the mixed exchange chamber to the cation exchange chamber and from the cation exchange chamber to the cathode chamber through cation membranes.

13. A method as claimed in claim 12 where the flow of water through each chamber is independent of other flows.

14. A method as claimed in claim 12 wherein the anode and cathode chambers are flushed with a desalting stream.

15. A method as claimed in claim 12 which involves two or more anion exchange chambers and/or two or more cation exchange chambers and/or two or more mixed exchange chambers, wherein the water to be purified flows through one or more subsequent anion exchange chambers and/or one or more subsequent cation exchange chambers and/or one or more subsequent mixed exchange chambers in the same or any suitable or relevant order.

16. A method as claimed in claim 12 wherein the water to be purified is combined with purified water prior to electrodeionisation.

17. A method as claimed in claim 12 wherein the water to be purified is combined with water provided by an outflow product.

18. A method of electrodeionisation comprising allowing water to be purified to flow through a cation exchange chamber containing exchange material consisting essentially of cation exchange material and neighboring a cathode chamber, followed by flow through an anion exchange chamber containing exchange material consisting essentially of anion exchange material and neighboring an anode chamber, followed by flow through a mixed exchange chamber located between the anion exchange chamber and the cation exchange chamber;
    allowing anions to flow from the mixed exchange chamber to the anion exchange chamber and from the anion exchange chamber to the anode chamber through anion membranes; and
    allowing cations to flow from the mixed exchange chamber to the cation exchange chamber and from the cation exchange chamber to the cathode chamber through cation membranes.

19. A method as claimed in claim 18 where the flow of water through each chamber is independent of other flows.

20. A method as claimed in claim 18 wherein the anode and cathode chambers are flushed with a desalting stream.

21. A method as claimed in claim 18 which involves two or more anion exchange chambers and/or two or more cation exchange chambers and/or two or more mixed exchange chambers, wherein the water to be purified flows through one or more subsequent anion exchange chambers and/or one or more subsequent cation exchange chambers and/or one or more subsequent mixed exchange chambers in the same or any suitable or relevant order.

22. A method as claimed in claim 18 wherein the water to be purified is combined with purified water prior to electrodeionisation.

23. A method as claimed in claim 18 wherein the water to be purified is combined with water provided by an outflow product.

* * * * *

UNITED STATES PATENT AND TRADEMARK OFFICE
CERTIFICATE OF CORRECTION

PATENT NO. : 7,279,083 B2 Page 1 of 1
APPLICATION NO. : 10/332658
DATED : October 9, 2007
INVENTOR(S) : Emery et al.

It is certified that error appears in the above-identified patent and that said Letters Patent is hereby corrected as shown below:

Column 5, Claim 1, line 4 - change "pan" to -- an --

Signed and Sealed this

Eighteenth Day of March, 2008

JON W. DUDAS
*Director of the United States Patent and Trademark Office*